Dec. 1, 1953 M. J. GELPI 2,661,390
MOLDED INSULATOR
Filed Jan. 29, 1949
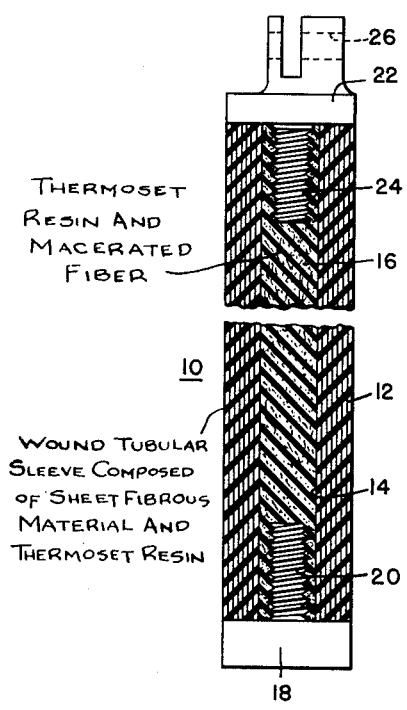
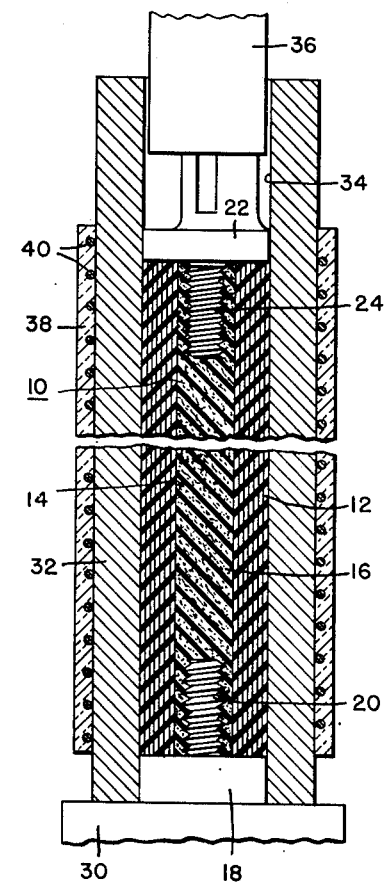
WITNESSES:
Edward Michaels
Nw. Le Groome
INVENTOR
MAURICE J. GELPI.
BY
Frederick Shope
ATTORNEY Patented Dec. 1, 1953

2,661,390

UNITED STATES PATENT OFFICE 2,661,390

MOLDED INSULATOR

Maurice J. Gelpi, Baltimore, Md., assignor to Westinghouse Electric Corporation, East Pittsburgh, Pa., a corporation of Pennsylvania Application January 29, 1949, Serial No. 73,474

2 Claims. (Cl. 174—178)

This invention relates to insulators and in particular to molded electrical insulators provided with metallic terminals or end fittings.

Heretofore the manufacture of electrically insulating structures embodying metallic terminals or end fittings has required expensive molding dies and complicated molding schedules. In many cases, the resulting product has been unsatisfactory because of the low mechanical strength and variable electrical properties due to the inadvertent formation of cavities and voids in the molded members.

The object of this invention is to provide a process for the preparation of electrical insulators having metallic terminals or fittings by a simple molding operation.

A further object of the invention is to provide a molded insulator having metallic terminals or fittings characterized by high strength and a dense resinous body having good electrical insulating characteristics.

Other objects of the invention will in part be obvious and will in part be apparent hereinafter. For a better understanding of the nature and objects of the invention, reference should be had to the following detailed description and drawing, in which:

Figure 1 is a vertical elevation partly in cross section and partly broken, and

Fig. 2 is a vertical cross section illustrating the molding of the insulators.

In accordance with this invention, molded insulators provided with metallic terminals or fittings are produced with outstanding strength and electrically insulating properties. Referring to Fig. 1 of the drawing, there is illustrated a molded insulator 10 produced in accordance with the invention. The insulator comprises a wound outer shell or tube 12 composed of a plurality of turns of a sheet of fibrous material impregnated and bonded together with a thermoset resin. The laminated construction of the outer tube 12 produces extremely high mechanical strength both in tension and in compression. A laminated tube also possesses high resistance to penetration by moisture providing the laminations forming the tube 12 are compacted together under high pressure, so that there are no voids between laminations and the laminations are well bonded to each other. The insulator 10 of the present invention is prepared with the tube 12 constituting more than 50% of the cross sectional area across a diameter. The interior of the tube is a hollow cylinder portion 14. Within the hollow cylinder portion 14 is disposed a highly compressed and solidified core 16 comprising macerated fiber and a thermoset resin body. Preferably, though not necessarily, the resin in the core 16 and the tube 12 is the same resin, though the resins may be dissimilar as long as they are compatible with and bondable to each other. Disposed within the hollow cylinder portion 14 at one end of the tube 12 is a metal fitting 18 having a roughened stem 20 while at the other end is another metallic fitting 22 having a roughened stem portion 24 also fitting within the hollow portion 14. The fitting 22 has an external aperture 26 for fastening to electrically charged members. While the roughened stem portions 20 and 24 are illustrated as being threaded, they may be knurled, grooved or otherwise mechanically treated to provide a surface capable of locking in securely with the resinous core 16 and the tube 12. The stems 20 and 24 are of a diameter smaller than the hollow portion 14, so that they may readily slip therein and permit the flow of resin between the stem and the tube 12 to secure the maximum adherence of the components into a rigid unitary structure.

It has been discovered that the molded insulator 10 may be prepared in accordance with a novel process employing only simple molding and other processing equipment to produce a molded insulation structure having outstanding physical and electrically insulating properties. The process first comprises rolling a sheet of fibrous material treated with a thermosettable resin into the tube 12. This may be accomplished in a number of ways. A convenient method has been to roll the resin treated fibrous material on a collapsible steel mandrel with sufficient pressure to produce a relatively tightly wound tube. In some cases, the tube has been partially cured by subjecting it to heat while on the mandrel. However, full curing of the wound tube 12 is to be avoided in the interest of securing a better bonded final structure. After having been formed or molded on the mandrel, the tube 12 may be removed and the ends trimmed to length and squared. The end fitting 18 is put into a cylindrical mold 32, as shown in Fig. 2, which is preferably a solid mold positioned on a base 30. Then the wound tube 12 is introduced into the mold to fit over the stem 20 and against the fitting 18. Thereafter a weighed amount of macerated or chopped fibrous material treated with thermosettable resin is put into the hollow 14 to form the core 16. The core 16 may be first preformed under pressure to a diameter that will admit it sliding down the hollow 14. However, this is not necessary.

Thereafter the other end fitting 22 is slid into bore 34 of a cylindrical mold 32 and a ram 36 is applied to the end of the fitting 32 to force it against the core 16. For an insulator having an outer diameter of 1¼" and a hollow 14, of ½" diameter, pressures of from 100 to 500 pounds on the ram 36 are adequate, though higher pressures may be employed.

The mold 32 is provided with a heating jacket 38 provided with a plurality of heating elements 40, such as electrical resistance wire. Under the influence of heat and pressure, the resin in the core 16 fuses and flows and exerts an internal expanding pressure against the tube 12, forcing the tube 12 into contact with the walls 32 of the mold. Furthermore, the fused resin permeates throughout the fibers of the core 16 and some of the macerated core flows up around the stems 20 and 24. The pressure on the fitting 22 should be sufficient to seat it against the end of the tube 12. Under the continuing influence of heat, the resin present in the tube 12 and the filling 16 thermosets. After having thermoset, the resin in the tube 12 and the core 16, the molded insulator may be pushed out of the mold 32 and the mold 32 re-employed for preparing more of the members.

It has been found that an important feature of the process enabling exceptionally strong and durable insulators to be molded resides in the step of applying the ram pressure to the filling 16, whereby the filling expands laterally within the hollow 14 and forces the sheet fibrous material, forming tube 12, outwardly. This puts the sheet fibrous material into tension, eliminating wrinkled or buckled sheet material, and enables the reinforcing properties of the sheet material to be utilized to a maximum.

When molded as disclosed herein, it will be found that the insulators are characterized by a dense, void-free resinous body in which the tube laminations are well bonded together without wrinkling.

It has been found that the use of woven or mat glass fiber as the sheet of fibrous material enables insulators of outstanding mechanical strength to be produced. The macerated filling or core 16 may be composed of the same fabric either chopped or otherwise cut up into small pieces. However, there may be employed cotton or asbestos fabric or fibers treated with resin. A particularly satisfactory resin for both the tube 12 and the core 16 is a polyester resin. Polyester resins are particularly desirable for insulators of the type disclosed herein, because the polyester compositions thermoset without the evolution of water or gases and thereby gas pockets and voids are avoided. Polyester resins may comprise (a) compounds containing at least two unsaturated groups >C=C< or they may comprise (b) an unsaturated alkyd resin dissolved in a polymerizable monomer having the groups $H_2C=C<$. Examples of the former are monomeric diallyl phthalate, diallyl maleate, diallyl succinate, diallyl adipate, diallyl crotonate and methallyl crotonate. Examples of the latter type of composition are the esters produced by reacting an alpha, beta unsaturated dibasic acid, such as maleic acid, maleic anhydride, fumaric acid, and citraconic acid with a polyhydric alcohol, such, for example, as ethylene glycol, propylene glycol, castor oil and pentaerythritol and dissolving the ester so produced in monomethacrylate, styrene, methyl methacrylate, diallyl phthalate, diallyl maleate or vinyl acetate. The polyester resins after being applied to the fibrous material may be partly cured or they may be employed while fluid. Ordinarily, a catalyst particularly a peroxide, such as benzoyl peroxide or terbutyl perbenzoate in an amount of the order of 0.1% to 1% is applied to the polyester to expedite curing. A temperature of 100° C. for 15 minutes to 150° C. for 5 to 10 minutes will thermoset the compositions.

For an insulator made in accordance with the invention of a length of 6½" between the fitting 22 and the center of the bore 26 and an external diameter of 1¼", a dielectric breakdown of 45,000 volts was obtained. It had extremely high tensile and compressive strength: in tension 1800 pounds was required to cause failure.

While the drawing shows a cylinder of circular cross-section, it will be appreciated that the cross-section may be elliptical, polygonal or otherwise to suit requirements. Square cross-section insulators constructed in accordance with this invention are contemplated.

Since certain changes may be made in the above invention, and different embodiments of the invention may be made without departing from the scope thereof, it is intended that all matter contained in the above-described disclosure shall be interpreted as illustrative and not in a limiting sense.

I claim as my invention:

1. A molded cylindrical insulator comprising a tubular outer shell composed of a plurality of turns of sheet fibrous material impregnated and bonded with a thermoset resin, the shell comprising at least 50% of the thickness of material along a diameter, the tubular outer shell having a central opening, a metallic fitting extending from each end of the tubular shell, the metallic fittings each having a roughened stem extending within the central opening, and a core disposed within the central opening, the core comprising a thermoset macerated fiber and resin body bonded to the tubular outer shell and to the roughened stems, the core applying an internal pressure against the tubular outer shell to put the turns of the sheet fibrous material in tension whereby the turns of the tube are relatively unwrinkled, the tubular outer shell providing for high mechanical strength, resistance to moisture and good electrical insulating properties.

2. A molded cylindrical insulator comprising a tubular outer shell composed of a plurality of turns of sheet glass fiber mat impregnated and bonded with a thermoset polyester resin, the shell comprising at least 50% of the thickness of material along a diameter, the tubular outer shell having a central opening, a metallic fitting extending from each end of the tubular shell, the metallic fittings each having a roughened stem extending within the central opening, and a core disposed within the central opening, the core comprising a thermoset macerated fiber and polyester resin body bonded to the tubular outer shell and to the roughened stems, the core applying an internal pressure against the tubular outer shell to put the turns of the sheet fibrous material in tension whereby the turns of the tube are relatively unwrinkled, the tubular outer shell providing for high mechanical strength, resistance to moisture and good electrical insulating properties.

MAURICE J. GELPI.

(References on following page)

References Cited in the file of this patent

UNITED STATES PATENTS

| Number | Name | Date |
|---|---|---|
| 906,026 | Hubert | Dec. 8, 1908 |
| 1,352,457 | Kempton | Sept. 14, 1920 |
| 1,409,148 | Apple | Mar. 14, 1922 |
| 1,502,829 | Kempton | July 29, 1924 |
| 1,504,547 | Edgerton | Aug. 12, 1924 |
| 1,572,937 | Kempton | Feb. 16, 1926 |
| 1,799,580 | Burke | Apr. 7, 1931 |
| 1,942,133 | Burke | Jan. 2, 1934 |
| 2,000,769 | Mansur | May 7, 1935 |
| 2,148,201 | Houwink | Feb. 21, 1939 |
| 2,213,922 | Stewart | Sept. 3, 1940 |
| 2,282,328 | Herrick et al. | May 12, 1942 |
| 2,302,564 | Megow et al. | Nov. 17, 1942 |
| 2,441,309 | Cook | May 11, 1948 |